United States Patent [19]
Solberg

[11] Patent Number: 5,713,691
[45] Date of Patent: Feb. 3, 1998

[54] LOW FORCE RELEASE MECHANISM FOR HIGH LOAD LATCH

[76] Inventor: Glenn S. Solberg, P.O. Box 611, Zahl, N. Dak. 58856

[21] Appl. No.: 380,855

[22] Filed: Jan. 27, 1995

Related U.S. Application Data

[63] Continuation-in-part of Ser. No. 110,241, Aug. 23, 1993, abandoned.

[51] Int. Cl.⁶ .................................................. B60D 1/00
[52] U.S. Cl. .......................... 403/322; 403/315; 292/203; 172/677; 280/504
[58] Field of Search ....................... 403/322, 321, 403/315, 320, 325, 24; 172/677, 678, 679, 680; 292/193, 146, 203; 280/504, 506, 507, 508, 515, 477

[56] References Cited

U.S. PATENT DOCUMENTS

| | | | |
|---|---|---|---|
| 2,349,301 | 5/1944 | Overby | 292/193 X |
| 2,435,444 | 2/1948 | Johnsen | 403/325 X |
| 2,913,263 | 11/1959 | Zajac | 423/325 X |
| 3,107,933 | 10/1963 | Royster | 403/315 X |
| 3,739,618 | 6/1973 | Lemper | 403/322 X |
| 4,073,524 | 2/1978 | Gianessi | 292/193 X |
| 4,836,707 | 6/1989 | Myers | 403/322 |
| 4,958,848 | 9/1990 | Nasy | 280/504 X |
| 4,962,945 | 10/1990 | Vannoy et al. | 280/508 |
| 5,302,045 | 4/1994 | Johnsen | 403/322 |
| 5,332,250 | 7/1994 | Thorwall et al. | 280/507 |
| 5,497,835 | 3/1996 | Laubner et al. | 280/508 X |

*Primary Examiner*—Harry C. Kim
*Attorney, Agent, or Firm*—Stephen G. Matzuk

[57] ABSTRACT

A latch for a hitch having release mechanism including a pair of parallel oriented cylinders which are disposed to lock together two separable elements of a hitch. The locking cylinders are disposed between the confronting surfaces within portions of the separable hitch elements to receive a compression force across the both of the cylinders when the hitch elements are receiving an tensions so as to separate them. To release the hitch elements while under tension, one of the cylinders is rotated, causing the adjacent, parallel disposed cylinder to rotate in the opposite direction, rolling over the confronting surfaces in the same directions, and eventually out of and releasing the two separable hitch elements. Multiple embodiments are shown which relate to variations in hitch styles, and further embodiments relate to smaller clamping devices, such as hand tools, and to rotational couplers which are releasable while under torque.

11 Claims, 9 Drawing Sheets

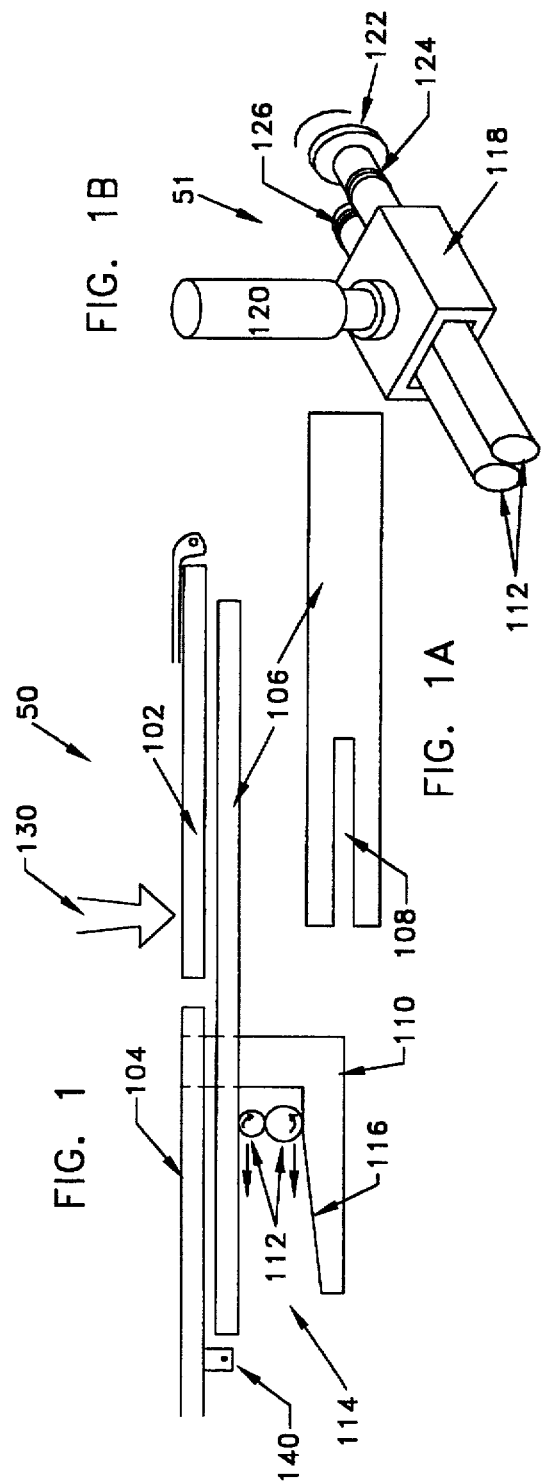
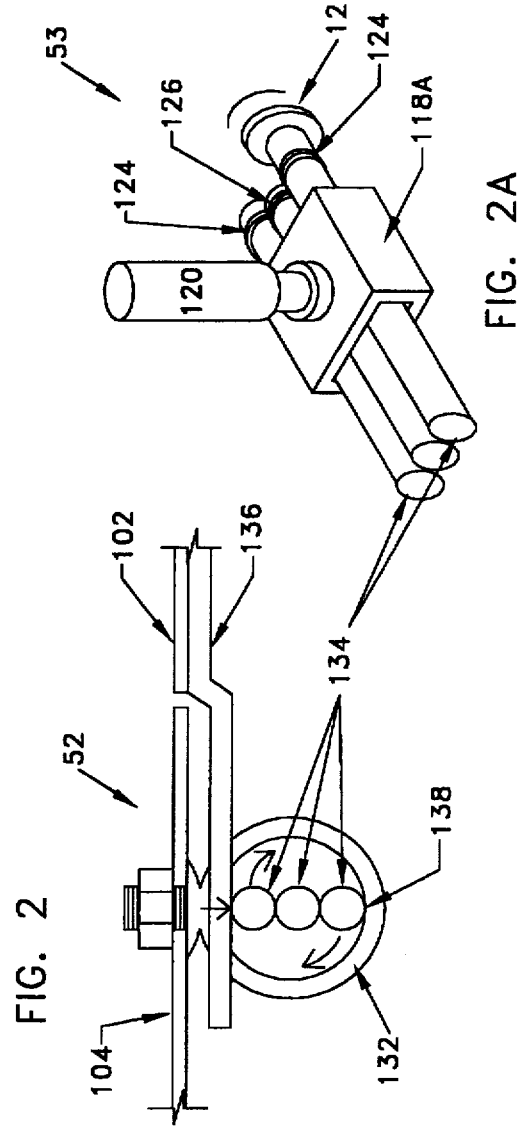

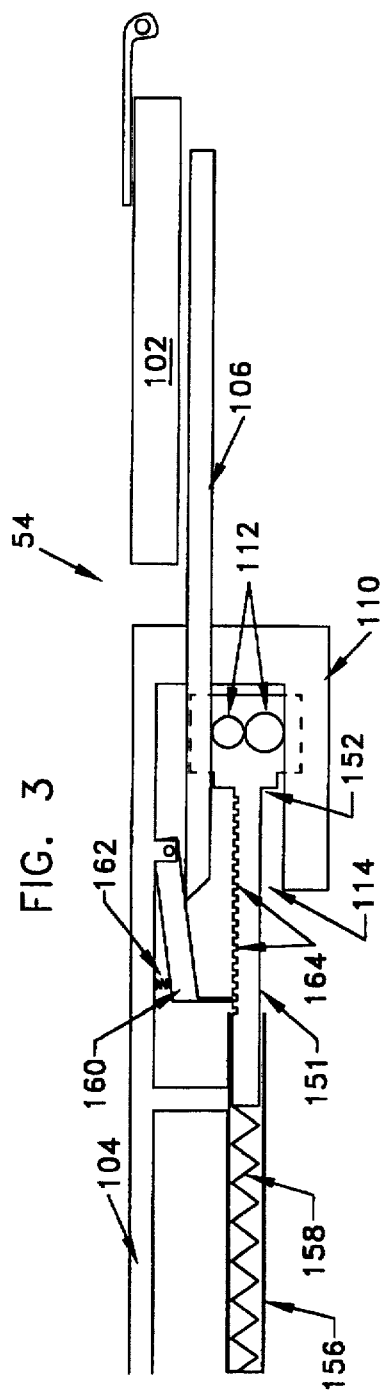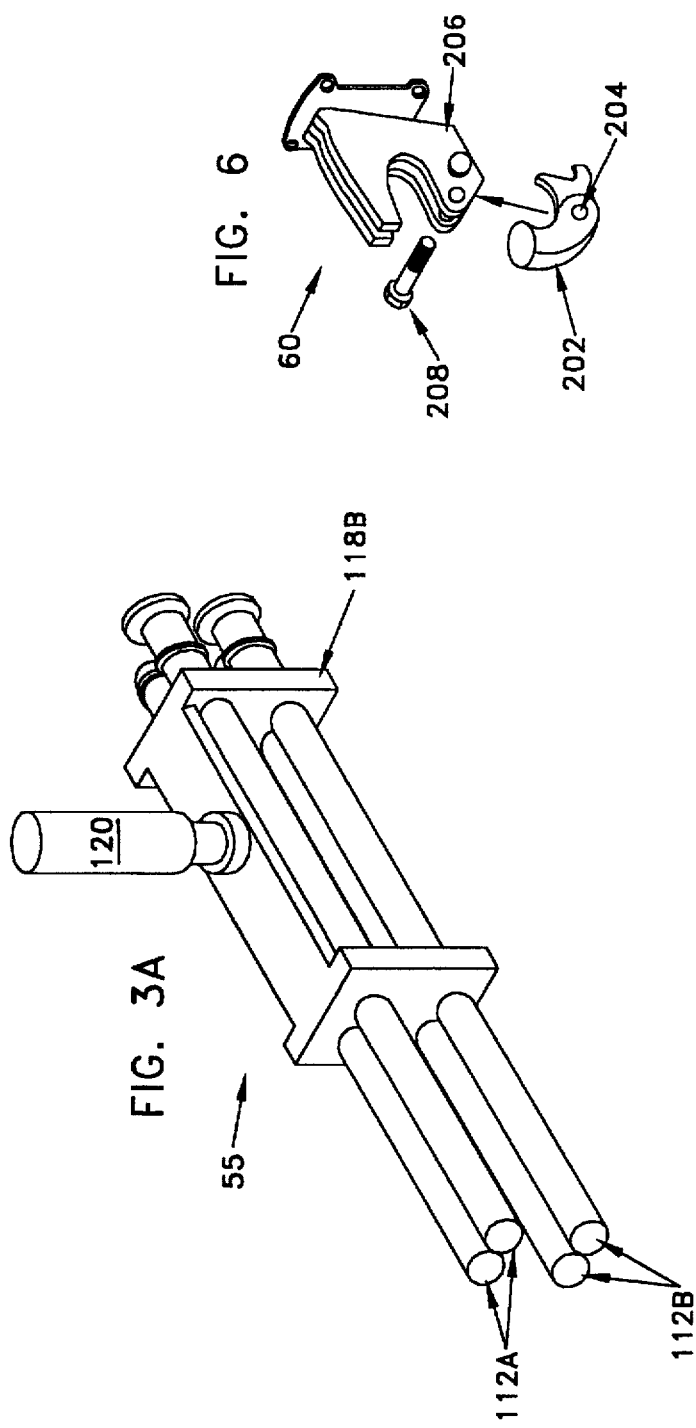

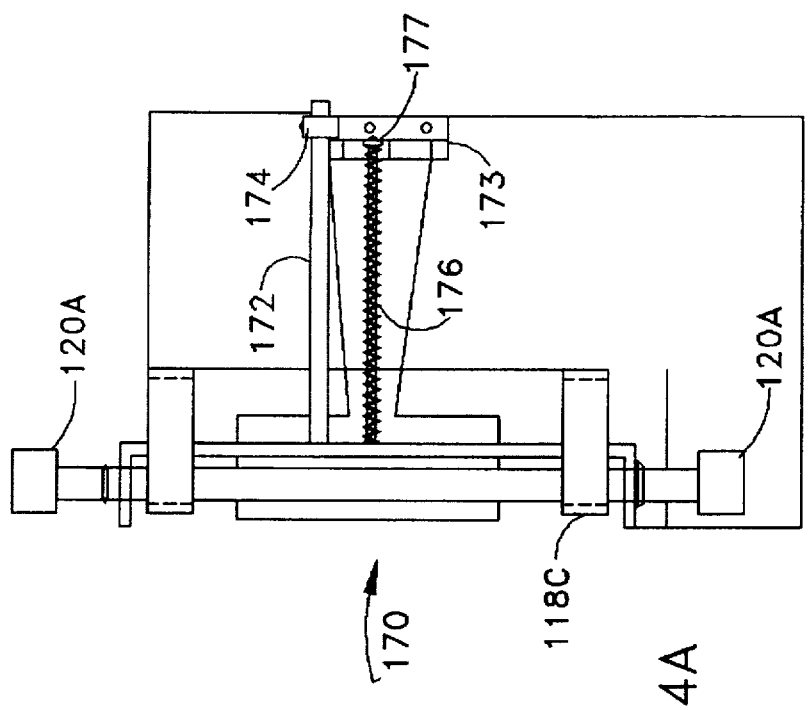
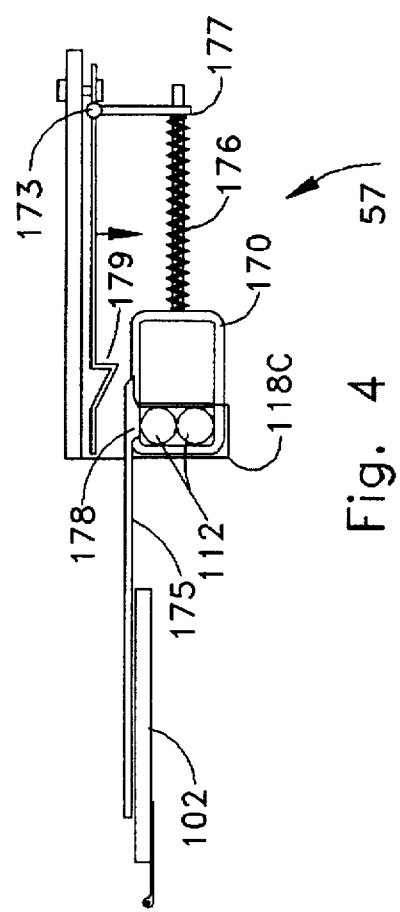
Fig. 4A
Fig. 4

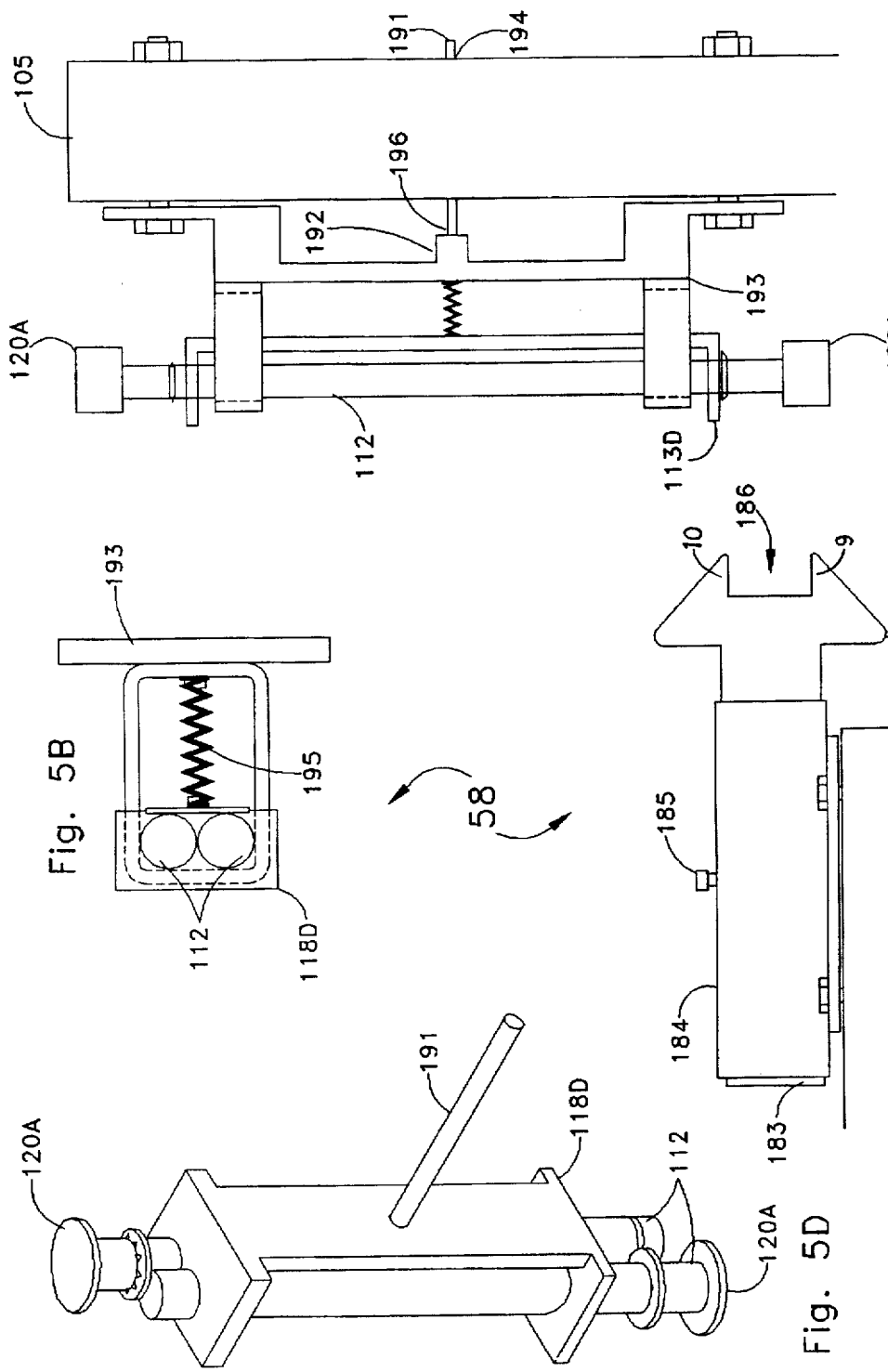

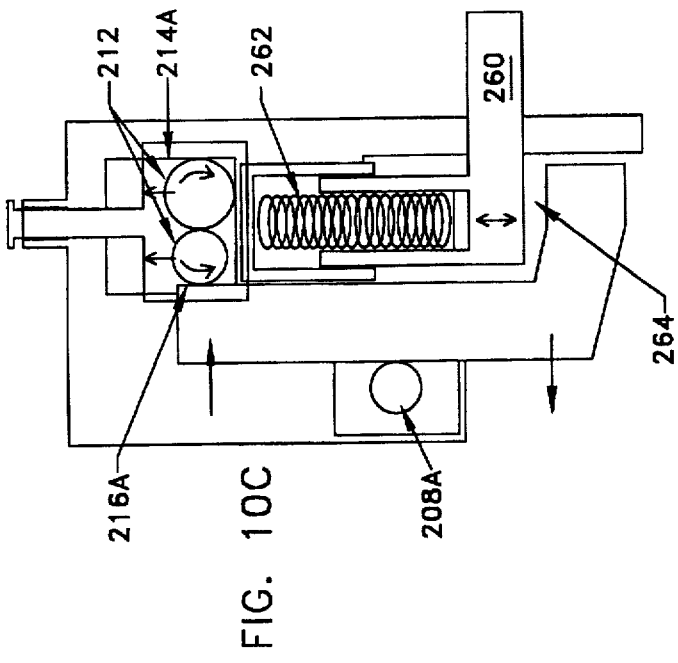
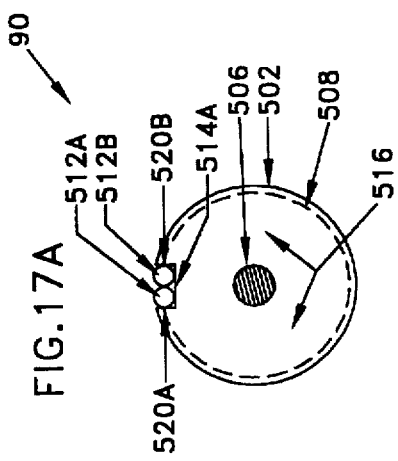
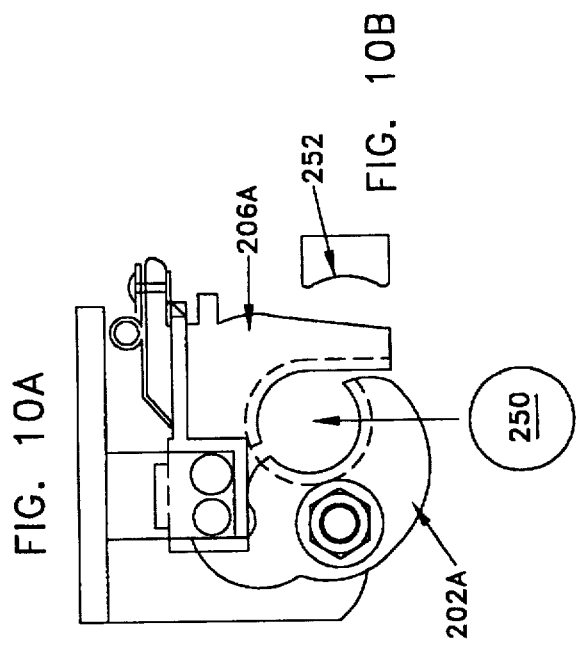
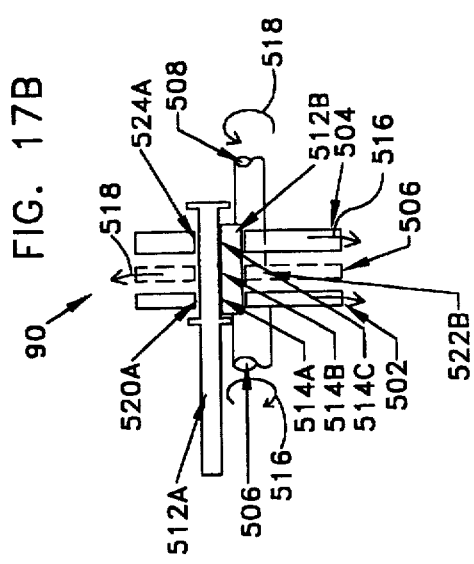

LOW FORCE RELEASE MECHANISM FOR HIGH LOAD LATCH

This is a continuation-in-part of parent patent application entitled PRESSURE RELEASE SYSTEM, Ser. No. 08/110, 241, filed 23 Aug. 1993, now abandoned.

FIELD OF THE INVENTION

The present invention relates to locking closure devices, in particular, to low release force locking closure devices such as latches, hitches and couplers having locking release mechanism operable while under load.

BACKGROUND OF THE INVENTION

Closure devices such as door latches, power couplers, trailer hitches have generally required precise alignment of two (or more) mating ends, and that the actual connection be made without load (compression, tension, etc). These requirements are difficult to satisfy simultaneously, even in the best of conditions. Typically, equipment to be towed or pulled by trailer hitch is on unequal footing and difficult to position to achieve the no-load alignment which will permit the operator to stop and set the hitch latch, securing the two pieces connected. Most often, the process is a time consuming, hit-or-miss, and iterative, multi-step process.

Releasing the equipment hitch, door and/or power coupling is equally or more frustrating when the load must be removed to allow a key element of the latch to be disengaged. In situations where it is not possible to remove the load, the operator must resort to brute force to remove the latch release element, with the obvious safety risks and equipment wear and tear.

SUMMARY OF THE INVENTION

The apparatus according to the present invention comprises a latch safely and easily operable and releasable under load conditions, comprising a release mechanism including a plurality, typically a pair, of parallel abutting locking cylinders disposed, under compression when the latch is closed and under load, between two surfaces associated with the objects to be hitched or latched together. To unlatch the hitch, the cylinders are rotated which, by being in contact with the surfaces, move out of alignment or out from between the surfaces, thus breaking the transmission of the compression and releasing the objects hitched or latched.

BRIEF DESCRIPTION OF THE DRAWING

These and further features of the present invention will be better understood by reading the following Detailed Description together with the Drawing, wherein FIG. 1 is a plan view of a door latch embodiment of the present invention;

FIG. 1A is a plan view of an element of the embodiment of FIG. 1;

FIG. 1B is an isometric view of a roller holder for the embodiment shown in FIG. 1;

FIG. 2 is a plan view of an alternate embodiment of a door latch embodiment of the present invention;

FIG. 2A is an isometric view of a roller holder for the embodiment of FIG. 2;

FIG. 3 is a plan view of a further alternate embodiment of a door latch embodiment of the present invention;

FIG. 3A is an isometric view of a alternate embodiment of a roller holder for the embodiment of FIG. 2;

FIG. 4 is a plan view of an alternate latch embodiment according to the present invention;

FIG. 4A is an elevation view of the roller latch assembly of the embodiment of FIG. 4;

FIG. 5A is a plan view of an alternate embodiment of a latch plate according to the present invention;

FIG. 5B is a plan view of a roller holder receivable by the latch of FIG. 5A;

FIG. 5C is an elevation view of the roller latch assembly of FIG. 5B;

FIG. 5D is an isometric drawing of the roller holder of FIG. 5B;

FIG. 6 is an exploded view of a partial assembly of a pintle hook embodiment of the present invention;

FIG. 10A is an elevation view of an alternate pintle hook embodiment of the present invention for use with ball hitches;

FIG. 10B is a plan view of alternate pintle hook embodiment for use with ball hitches;

FIG. 10C is a plan view of an alternate embodiment of the present invention providing a spring loaded pintle hook;

FIG. 17A and FIG. 17B are elevation and plan views of an alternate embodiment of the present invention as a rotary power coupling.

DETAILED DESCRIPTION OF THE INVENTION

Figure 7:
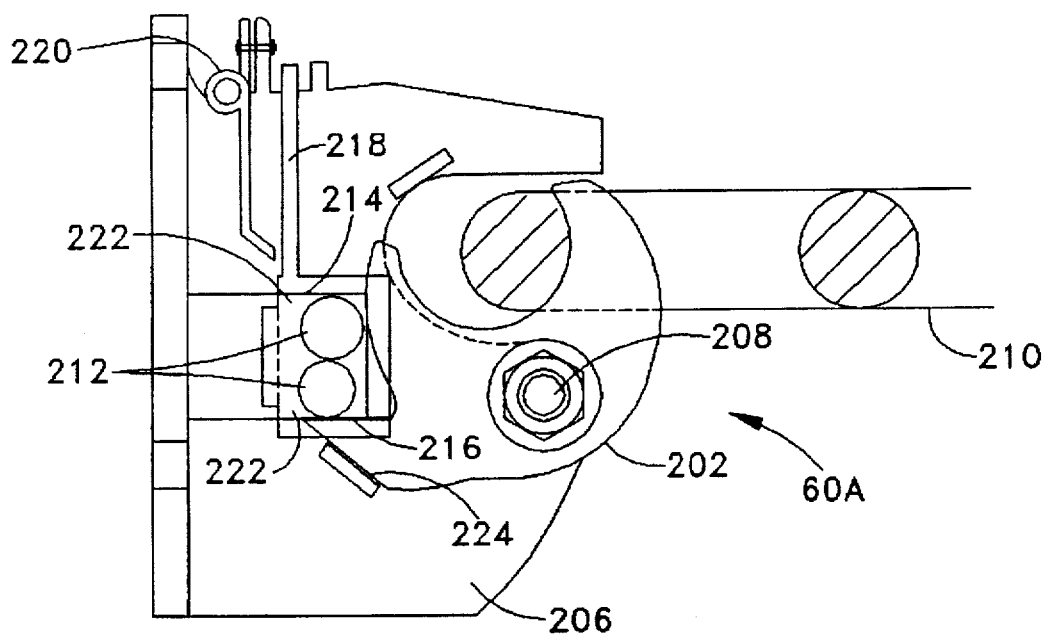
FIG. 7 is an elevation view of a pintle hook embodiment of the present invention showing the hook locked.

A latch embodiment 50 according to the present invention is typically used for closure of a hinged door 102 and a wall 104, such as found on farm grain storage bin. A first plate 106, also shown in FIG. 1A, is typically mounted at the free end of the hinged door 102 and has an aperture 108 therein through which protruding element 110, attached to the wall 104, is received when closed. Rollers 112, typically a pair of parallel abutting cylindrical elements of the same or differing diameters, are received through opening 114 between plate 106 and protruding element 110. The surface 116 facing the rollers 112 may be contoured to provide an initially larger opening to the rollers and decrease to a narrower distance to the wall 104 to urge the plate 106 more completely against the wall 104.

The rollers 112 are shown in a holder 51 which retains the rollers 112 in a housing 118 held by handle 120. One of the rollers 112 has a flange knob 122 to assist turning, and a snap washer 124 in a notch and engaging a notch 126 in the adjacent roller. In operation, the rollers are rolled into opening 114 to secure plate 106 and protruding element 110, which may be released by reversing the process. If there is a load 130 as may occur with a full grain bin, the latch including the plate 106, element 110 and rollers 112 may easily be released by rolling the rollers 112 out of the opening 114.

An alternate embodiment 52 of the latch according to the present invention is shown in FIG. 2, having an eyebolt protruding element 132 through which three rollers 134 are received and retain plate 136 to close door 102 along wall 104. It is desired that the plate 136 be raised to present a diminished dimension 138 to rollers 134 into (and out of) which the rollers can be moved by rolling, and thus secure (or release) the latch 52.

The roller holder 53 for the three rollers is shown in FIG. 2A, wherein housing 118A retains three rollers having mating snap rings 124 and groove 126 to enhance coupling of rotational force.

A further embodiment 54 of the latch according to the present invention is shown in FIG. 3, which includes a self-tripping roller holder 152 which has an extension 154 retained by a tube 156. A spring 162 loaded pawl 160 normally engages one of the notches 164 to hold the rollers 112 out of the path of the plate 106 on hinged door 102 against the force of the spring 158. When the door 102 and the plate 106 is brought into an extreme closed position, the plate 106 moves pawl 160 out of the notch 164, allowing the spring 158 to urge rollers 112 into the opening 114 by a spring 158, locking the latch. The latch is released by rolling the rollers 112 out of the opening as described previously. A roller holder such as the roller holder 51 shown in FIG. 1A, may be used, or a roller holder 55 having a double pair of rollers 112A and 112B, retained by housing 118B, shown in FIG. 3A, may also be used for increased strength and/or reduced release effort.

A further latch embodiment according to the present invention is shown in FIG. 4, wherein the rollers 112 are retained by a holder 118C that is permanently retained by a rod 172 which is retained by a guide 174 attached to the hinge 173, and permits movement of the roller holder 118C toward and away from the hinge 173. The roller latch assembly 170 is also shown in FIG. 4A. A rod 174 retains a spring 176 which urges the roller holder 118C toward the plate 175 and away from the hinge extension 177 attached to the hinge 173. When the latch is locked, the rollers 112 rest against the plate 175, which may include a raised shoulder 178 to provide a tighter closure. When the latch is locked, and the rollers 112 are rotated by device 120A which may comprise a knob, lever or receive a suitable tool, the rollers 112 withdraw from the plate 175 and compress the spring 176 against hinge extension 177 which causes a hook 179 mounted on the hinge, to swing outward and engage a portion of the roller assembly 170 to keep the latch open while the door 102 is opened. When the door or gate 102 closes, the plate 175 strikes the hinge portion having the hook, causing the hook to release the roller holder, thus locking the gate.

A further latch embodiment 58 according to the present invention as shown in FIGS. 5A–5D, includes a latch plate assembly 180 having an adjustable latch plate 182 with an extension 183 received by a holder 184. The extension 183 is slidable within the holder 184 to be adjusted to engage rollers 112 (of FIG. 5B) and held by screw 185. The latch plate 182 includes a notch 186 to receive the rollers 112 when the latch is locked, and inclined portions 187 to cause rollers 112 and their holder 190 to retract before engaging the notch 186.

The rollers 112 are in contact and operable as described above, and are retained by a roller holder 118D which has a generally perpendicular stabilizer rod 191 attached and is received by a guide 192 in a roller holder frame 193 and by a hole 194 in the gate post 105 to move back and forth with the rollers parallel to the door or gate 104. The stabilizer rod 191 assures alignment of the roller holder 118D, and in the event that the plate 182 engages the rollers near an end, that the opposite end of the rollers move as well, assuring a roller motion generally parallel to the post 105 and perpendicular to the plate 186. A spring 195 biases the roller holder 118D away from the roller holder frame 193 and toward the notch 186. Typically, to ensure that the rollers are not bound by the rod 191 in any holes, the post hole 194, the most distant from the roller holder 118D, is also the smallest hole. The rod 191 may be shortened, such as by cutting at 196, which, in view of the free play between the rod 191 and the hole(s), will make the latch more resistant to opening by bumping the gate.

If the sides of the notch are angled, such as making one side 9 have an angle greater than 90°, and the confronting surface 10 have an angle less than 90°, the latch may be configured to allow the latch to be opened by applying a force to the side having the angle less than 90°, while increasing the resistance to opening from the opposite side. Typically, the surfaces 9, 10 may be adjusted by filing the latch plate 182

The present invention is also applicable to trailer hitches, such as ball hitches and pintle hook arrangements. An exploded, partial assembly view of a typical pintle hook hitch 60 is shown in FIG. 6. The pintle hook 202 engages an annular hitch member 210, shown in FIG. 7, below, attached to the equipment to be towed (not shown). The pintle hook 202 pivots at 204 within housing 206 which is typically mounted to the rear frame member of a truck (not shown) on bolt 208.

Figure 8:
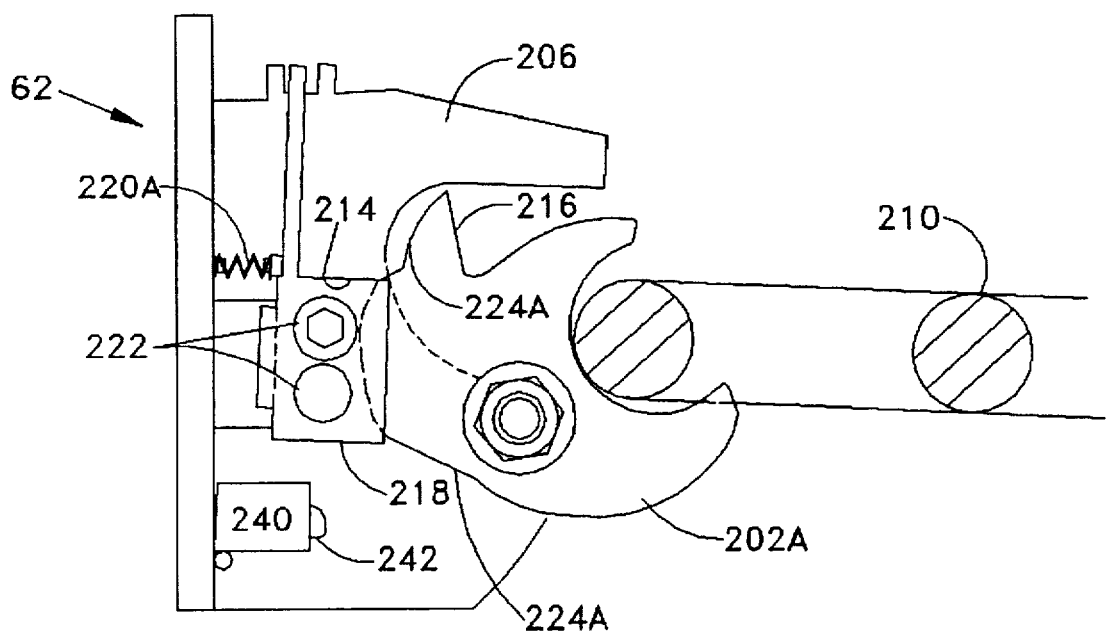
FIG. 8 is an elevation view of a pintle hook embodiment of the present invention showing the hook released and with an optional upward guide.

A vertical plan of an embodiment of the pintle hook 60A is shown in FIG. 7. When the hitch is engaged, the hook 202 retains the annular hitch element 210 in a closed position which is locked by a latch including rollers 212 between a surface 214 which is part of the housing 206 and a surface 216 which is part of the pintle hook 202. The rollers 212 are retained in a holder 218 which is pivotally mounted from the top of the housing 206. A spring 220 urges the rollers 212 into the opening 222 between the surfaces 214 and 216 when the pintle hook 202 moves into the closed position. A contoured and inclined surface 224 (and 224A) on the pintle hook 202 permits the portion of the hook 202 to move past the rollers 212 as the hook 202 (and 202A) moves to the closed position, as shown in FIG. 8. Typically, one of the rollers 212 includes a nut, lever or other handle (not shown for clarity) on the end of the particular roller to facilitate hand operated roller rotation.

Figure 9:
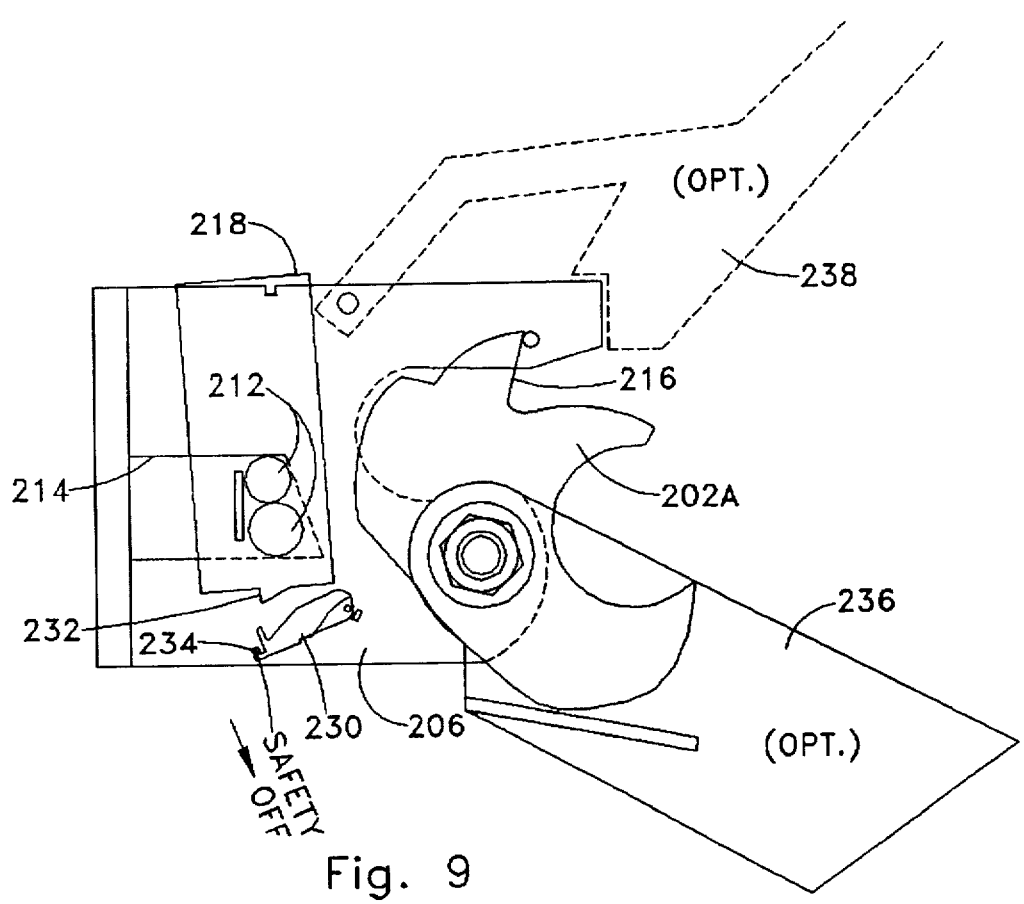
FIG. 9 is an elevation view of a pintle hook embodiment of the present invention showing the hook partially closed.
Figure 10:
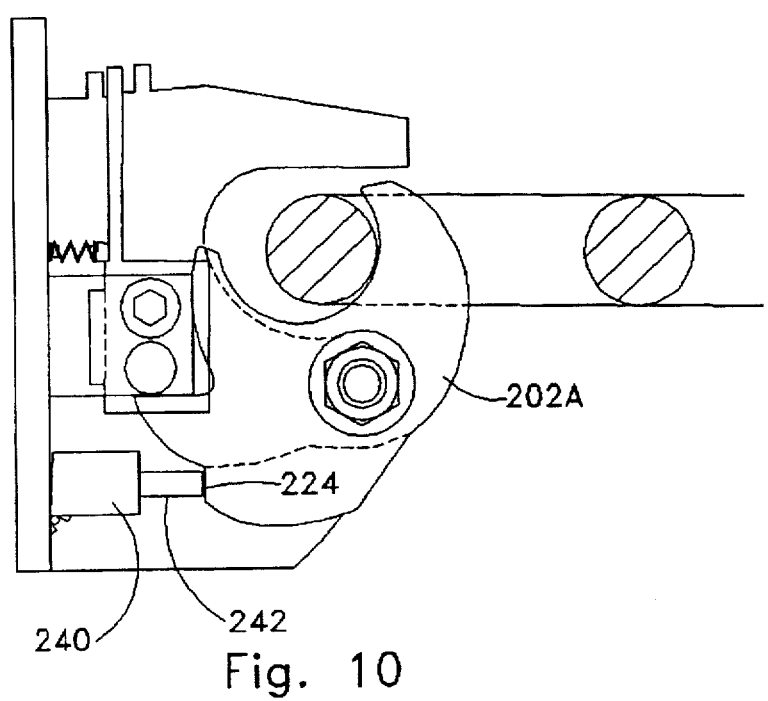
FIG. 10 is an elevation view of a pintle hook embodiment of the present invention showing the hook released and with optional upward and downward guides.

In operation, to release the hook 202 while under a (tension) load, the rollers are rotated (top roller clockwise, bottom roller counter clock-wise), whereupon the rollers roll against the surfaces 214 and 216 and out of the opening 222, releasing the pintle hook 202 and the annular hitch element 210 to provide an open hitch 62 as shown in FIG. 9. Also shown is a modified roller holder 218A having a tab 232 to engage a spring loaded safety 230 which retains the rollers in the locked position safety latch unless released by safety off lever 234. Also shown are an upward leading hitch guide 236 and an optional downward leading hitch guide 238, which guides equipment hitch elements which are biased below or above the level of the pintle hook into the pintle hook hitch. An alternate safety latch 240 is shown in FIG. 10, wherein an extension 242 selectively engages the pintle hook 202 directly at a confronting and engaging location 224B on the contoured surface of the pintle hook 202A. The safety latch 240 is operable mechanically, electrically, pneumatically or hydraulically, or simply moved out of the way, as desired.

An alternate embodiment 64 of the pintle hook according to the present invention is shown in FIG. 10A, which is horizontally oriented to receive a ball hitch element 250 between the pintle hook 202A and housing 206A, which are modified to include a curved recess 252 as shown in cutaway view of FIG. 10B.

A further alternate embodiment shown in FIG. 10C of the pintle hook according to the present invention includes a spring 262 loaded member 260 to provide a constant force to hold a coupling element in area 264 against the pintle hook 202B to avoid banging the pintle hook from intermittent tow loads.

Figure 11:
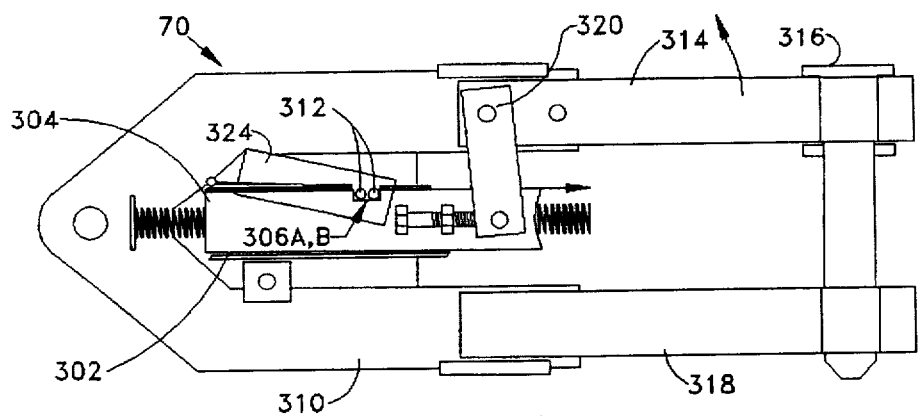
FIG. 11 is an elevation view of an alternate pintle hook embodiment of the present invention having a single acting clevis and pin.
Figure 11A:
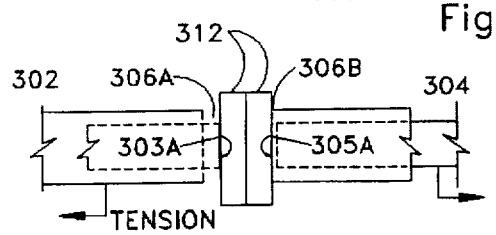
FIGS. 11A and 11B are plan views showing tension and compression forces applied to the rollers by surfaces of notches of tubular hitch elements of FIG. 11.
Figure 11B:
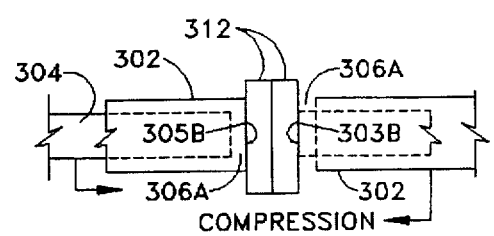

A further embodiment 70 of a hitch according to the present invention is shown in FIG. 11, wherein two concentric sliding tubular elements 302, 304, each having a notch 306A, 306B forming a coincident aperture in the sides of both tubular elements 302, 304. The inner tubular element 304 is axially movable relative to the outer tubular element 302, and is locked into the position of coincidence by a pair of roller elements 312 received into the notches 306A and 306B. The notch of the outer tubular element includes a surface and the notch of the inner tubular element includes a second surface which imparts a force on the rollers when the axial tension or compression is applied to the rollers, as shown in the top view of FIGS. 11A and 11B, respectively, and described in parent application Ser. No. 08/110,241, incorporated by reference. The outer cylinder 302 is mounted on the hitch support 310. A movable upper clevis arm 314 receives a pin 316 to secure the towed equipment hitch element (not shown), and is pivotally mounted on hitch support 310 and coupled by element 320 to the inner tubular element 304. When the inner and outer tubular elements 302 and 304 are locked together by rollers 312, the upper arm 314 is locked into a closed position. Rollers 312 are retained by a holder 324 pivotally mounted on the support 310. Spring 322 urges the tubular elements, and thus the hitch 70 open when the rollers are rolled out of the notches 306A and 306B. Spring 326, when in contact with the hitch element of the towed equipment (not shown), urges the inner tubular element into the position which permits the rollers 312 to lock the tubular elements and the upper arm 314 into closed position.

Figure 12:
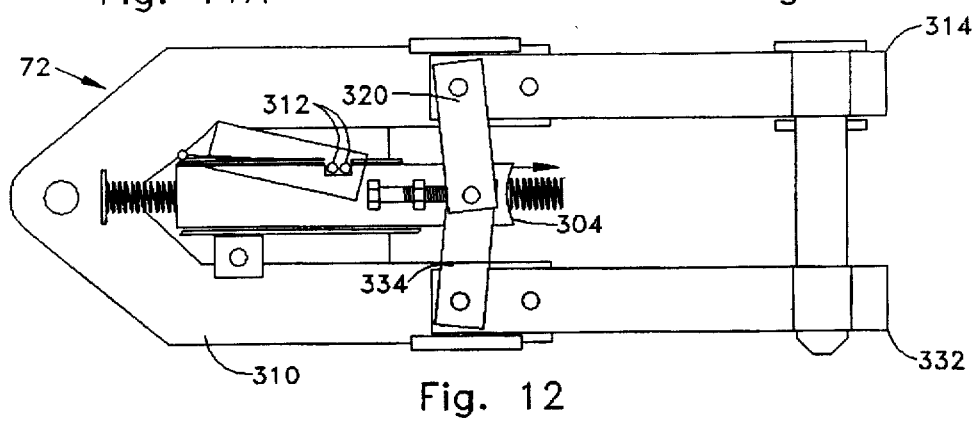
FIG. 12 is an elevation view of an alternate pintle hook embodiment of the present invention having a double acting clevis and pin.

An alternate embodiment 72 of hitch of FIG. 11 is shown in FIG. 12, wherein the lower arm 332 is pivotally mounted on the hitch support 310, coupled to inner tubular element 304 by element 334 and is movable in concert with the upper arm 314 according to the movement of the inner tubular element 304.

Figure 13:
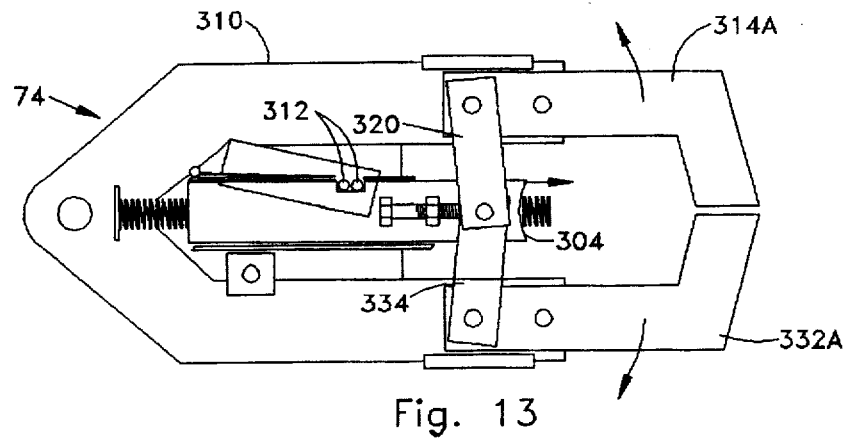
FIG. 13 is a plan view of an alternate pintle hook embodiment of the present invention having double acting jaws.

An alternate embodiment 74 of hitch of FIG. 12 is shown in FIG. 13 which includes confronting jaws, such as found on construction cranes, in place of arms 314 and 332, and similarly operable.

Figure 14:
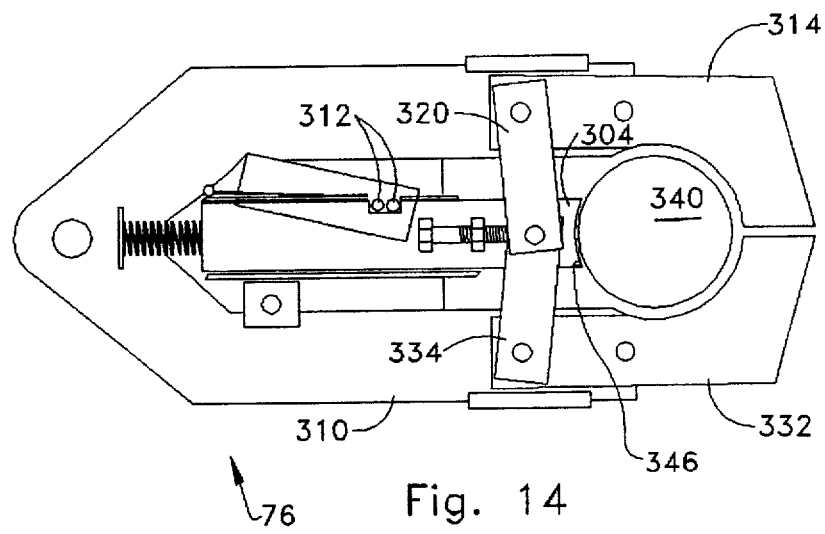
FIG. 14 is an elevation view of an alternate pintle hook embodiment of the present invention having double acting jaws adapted to accept a ball hitch.

A further alternate embodiment 76 of the hitch of FIG. 12 is shown in FIG. 14, wherein the hitch is horizontally disposed and accepts a hitch ball 340 mounted on the towed equipment. The ball hitch arms 342 and 344 replace the arms 314 and 332 and are similarly operable. Additionally, the hitch arms 342 and 344 may have a concave cross section, such as shown by FIG. 10B in the region in contact with the hitch ball 340. Additionally, the forward end of the inner tubular element includes a curved surface 346 in close proximity to the ball when locked in the hitch to restrict the movement of the hitch ball toward the tubular elements.

Figure 15:
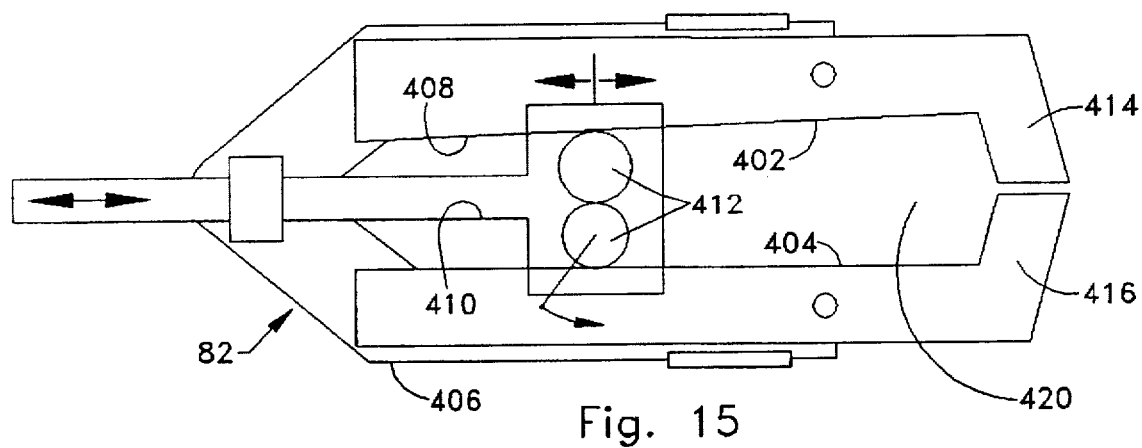
FIG. 15 is an elevation view of an alternate embodiment of the present invention providing variable jaw spacing.

An alternate embodiment 82 of the present invention, shown in FIG. 15, comprises a clamp having a first and a second arm 402, 404, respectively. Each arm 402, 404 has a forward and a rearward end, and a pivot point therebetween, wherein it is mounted to a support 406 to provide confronting surfaces 408, 410 along which a pair of rollers 412 may move. Typically, the forward ends of the arms 402, 404 comprise jaws 414, 416. When the rollers are in contact with the confronting surfaces 408 and 410 closer to the pivot points, the jaws are somewhat spaced apart, releasing the towed equipment hitch element (not shown). However, as the rollers are moved in contact with the portions of the surfaces 408, 410 increasingly distant from the pivot points of the arms 414, 416, the confronting surfaces are contoured to cause the jaws 414, 416 to be moved toward each other to make contact. Thus, this embodiment of the present invention may also provide a selectable pressure between the jaws 414, 416 as well as capture a towed equipment hitch member in the area 420 within the jaws 414, 416.

Figure 16:
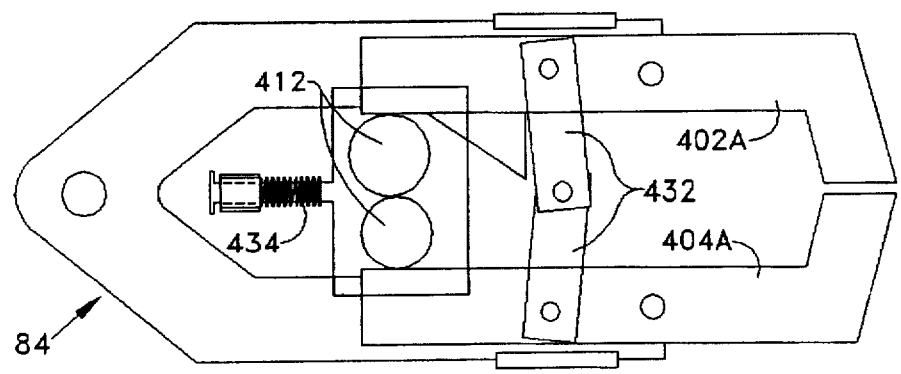
FIG. 16 is an elevation view of an alternate embodiment of the present invention having a spring loaded latch and double acting jaws.

A further alternate embodiment 84 according to the present invention is shown in FIG. 16, wherein the pivoting dual arms 402A and 404A are pivotally mounted on a support member 406 and are linked to cause the jaws 414, 416 to move oppositely by link members 432. Rollers 412 are retained by a holder 430 which is biased by spring 434 to hold the jaws 414, 416 open when the rollers 412 are not between the rearward portion of the arms 402A, 404A.

An embodiment of a latchable rotary coupler 90 according to the present invention is shown in FIG. 17A and FIG. 17B, which embodiment permits the rotary coupling to be released while under a torque load. Endplates 502, 504 are connected to a first (input) shaft 506 and a middle plate 508 is connected to a second (output) shaft 510. A notches 514A, 514B and 514C, when aligned, receive rollers 512A, 512B and are in contact with surfaces 520A, 522B, 524A when opposing torque forces 516, 518 are applied. Thus, to release the coupling while torque is present, the rollers 512 are easily rolled radially out of the notches 514A, 514B and 514C, permitting the shafts to turn independently of each other. Suitable roller holders may be adapted from the other embodiments discussed, above.

Handles, cranks, and other elements attached to the rollers to permit or facilitate hand or machine rotation of the cylindrical roller elements have been omitted for clarity, and such elements may be added as desired or permitted. Moreover, the cylinders do not need to be the same diameter, no limited to two or three as shown in the embodiments, but may include greater number of cylindrical elements which also provide the inventive latch release rolling motion. Further modifications and substitutions according to the present invention made by one of ordinary skill in the art are within the scope of the present invention, which is not to be limited except by the claims which follow.

What is claimed is:

1. An apparatus for selectively locking and releasing first and second objects, comprising:

a first member adapted to be connected to said first object and having a first surface;

a second member adapted to be connected to said second object and movable relative to said first member, and having a second surface substantially confronting said first surface; and a first and a second cylindrical elements each having an axis, said first and second cylindrical elements being serially disposed between said first and second surfaces to lock said first and said second members in a selected relative position, wherein said axes of said first and second cylindrical elements are in substantially parallel alignment, said first and second surfaces are disposed to apply a compression force to said serially disposed first and second cylindrical elements, respectively, to urge said first and second cylindrical elements together, and wherein means for oppositely rotating said first and second cylindrical elements about their respective axes to move said first and second cylindrical elements along said first and second surfaces releasing said first and second members, said means for oppositely rotating being connected to at least one of said first and said second members.

2. The apparatus of claim 1, wherein said first member comprises a substantially planar member having an aperture therein and including said first surface, said first member adapted to lie in a first plane when in the locked position, said second member comprises an angular member extending through said first member aperture and including said second surface substantially parallel to said first surface when in the locked position.

3. The apparatus of claim 1, further including spring means for urging said first and second cylindrical elements between said first and second surfaces to provide said locked condition, and trigger means to retain said first and second cylindrical elements when said first and second cylindrical elements are withdrawn from said first and second surfaces and said first member is released, said trigger means includes inhibiting means to withdraw said trigger means when said first member is manually brought toward an extreme closed position.

4. The apparatus of claim 1, wherein said first member comprises a first circular member rotatable about an axis, said second member comprises a second circular member rotatable about an axis coincident with the axis of the first member, and wherein said apparatus provides selectable rotational coupling.

5. The apparatus of claim 1, wherein said first member is pivotable mounted on said second member, and said first and second surfaces are substantially parallel when said objects are locked together.

6. The apparatus of claim 5, further including spring means to urge said first and second cylindrical elements between said first and second surfaces, to provide a secure locking state.

7. The apparatus of claim 6, further including means to urge said first and second cylindrical elements to compress said spring means as said first member is pivoted from a released to an open position, wherein said means to urge said first and second cylindrical elements releases said first and second cylindrical elements between said first and second surfaces when in the locked position.

8. The apparatus of claim 7, further including guide means attached to said second member to guide said first object toward said first member.

9. The apparatus of claim 8, wherein said guide means extends upward to the level of said second member.

10. An apparatus for selectively locking and releasing first and second objects, comprising:

a first member adapted to be connected to said first object and having a first surface;

a second member adapted to be connected to said second object and movable relative to said first member, and having a second surface confronting said first surface; and a plurality of cylindrical elements each having an axis, said plurality of cylindrical elements being serially disposed between said first and second surfaces to lock said first and said second members in a selected relative position, wherein said axes of said plurality of cylindrical elements are in substantially parallel alignment, said first and second surfaces are disposed to apply a compression force to said plurality of cylindrical elements, respectively, to urge said plurality of cylindrical elements together, and wherein means for rotating said plurality of cylindrical elements about their respective axes to move said plurality of cylindrical elements along said first and second surfaces releasing said first and second members, said means for rotating said plurality of cylinders being connected to at least one of said first and said second members.

11. The apparatus of claim 10, wherein said plurality of cylindrical elements comprises three cylindrical elements, one of said first and second surfaces is curved in a single axis to present concave surface toward the other of said first and second surfaces, and wherein rotation of one of said plurality of cylindrical elements causes said plurality of cylindrical elements to rotate as a group between the first and second surfaces.

* * * * *